United States Patent [19]

Cope

[11] Patent Number: 4,477,878

[45] Date of Patent: Oct. 16, 1984

[54] DISCRETE FOURIER TRANSFORM WITH NON-TUMBLED OUTPUT

[75] Inventor: Stephen N. Cope, Farnborough, England

[73] Assignee: Solartron Electronic Group Limited, Farnborough, England

[21] Appl. No.: 299,258

[22] Filed: Sep. 3, 1981

[30] Foreign Application Priority Data

Sep. 19, 1980 [GB] United Kingdom ............... 8030333

[51] Int. Cl.$^3$ ............................................. G06F 15/31
[52] U.S. Cl. ................................................. 364/726
[58] Field of Search ...................................... 364/726

[56] References Cited

U.S. PATENT DOCUMENTS

| | | | |
|---|---|---|---|
| 3,591,784 | 7/1971 | Cutter et al. ........................ | 364/726 |
| 3,601,592 | 8/1971 | Cutter et al. ........................ | 364/726 |
| 3,673,399 | 6/1972 | Hancke et al. ...................... | 364/726 |
| 3,748,451 | 7/1973 | Ingwersen ........................... | 364/726 X |
| 3,812,470 | 5/1974 | Murtha et al. ...................... | 364/726 X |
| 3,871,577 | 3/1975 | Avellar et al. ...................... | 364/726 |
| 4,138,730 | 2/1979 | Ali ........................................ | 364/726 |
| 4,156,920 | 5/1979 | Winograd ............................ | 364/726 |

FOREIGN PATENT DOCUMENTS 1407401 9/1975 United Kingdom .
1530050 10/1978 United Kingdom .
1546173 5/1979 United Kingdom .

OTHER PUBLICATIONS

Silverman, "An Introduction to Programming the Winograd Fourier Transform Algorithm (WFTA)", *IEEE Trans. on Acoustics, Speech & Signal Processing*, vol. ASSP-25, No. 2, Apr., 1977, pp. 152–165.
Bernard Gold and Charles M. Rader, "Digital Processing of Signals", Lincoln Laboratory Publications, McGraw-Hill Book Company, pp. 172–197.

*Primary Examiner*—David H. Malzahn
*Attorney, Agent, or Firm*—Dale Gaudier

[57] ABSTRACT

A microprocessor is programmed to perform the DFT on data points read out from and written back into a RAM. In each of a plurality of levels of the transform the points are read out in small groups, subjected to a discrete Fourier transform and written back into different addresses in order to avoid jumbling the order of the points in the ultimate output. The read-out and write-in addresses are read out of a PROM in sequence for each group and added to a base address in a latch. A -N latch, adder and multiplexer ensure that the addition is modulo N. After each group, the base address is changed to a new value by adding another value read out of the PROM and all addresses are worked through in this way in each level. At the start of each level the microprocessor puts the correct PROM start address in a latch and the number of groups (m) in a counter which is decremented to count off the groups and signal the end of a level. The PROM thus stores address value sequences for each level, starting at different start addresses. Moreover there may be different sets of start addresses for different algorithms catering for different numbers of points and forward and inverse transforms.

8 Claims, 2 Drawing Figures

DISCRETE FOURIER TRANSFORM WITH NON-TUMBLED OUTPUT

BACKGROUND OF THE INVENTION AND PRIOR ART

The present invention relates to apparatus for performing the discrete Fourier transform (DFT). There are various known algorithms for reducing the discrete Fourier transform for N points to manageable proportions where N is large, say of the order of 1000 or larger. Some such algorithms are described in the chapter "Discrete Fourier Transforms" in the book "Digital Processing of Signals" by Gold and Rader, Mc-Graw-Hill 1969. The DFT Proceeds in a series of levels in each of which a new set of points is created from an old set of points by performing a plurality of elementary DFTs. The points are, in general, complex quantities although the first old set, i.e. the input set, and the last new set, i.e. the output set, may well be real quantities, eg in transforming time samples of a waveform to frequency spectrum components or vice versa.

In a version of the algorithm well-known as the Colley-Tukey algorithm or fast Fourier transform, in which $N=2^P$ and there are P levels, each elementary DFT consists in forming a pair of new points from a pair of old points by forming sum and difference values from the old points multiplied by coefficients which are powers of $e^{-(2\pi/N)}$. Other versions of the DFT algorithm, such as the Winograd algorithm, require N to be the product of a plurality of small numbers which are prime relative to each other. For example, the embodiment of the invention which is descirbed below has $$N = 840 = 3 \times 5 \times 7 \times 8.$$

A larger value of N is given by $$N = 1260 = 4 \times 5 \times 7 \times 9.$$

In this class of algorithm, where the small relatively prime numbers are q, r etc., one level performs N/q q-point DFTs, another performs N/r r-point DFTs, and so on. For the general case of an n-point DFT, an n-point old vector has to be multiplied by an n by n matrix to form an n-point new vector. The matrix values, like the vector points, are in general complex. A further known simplification consists in decomposing the matrix into the product of three matrices of which the first contains 0 and 1 values only, the second of which is a diagonal matrix with diagonal values each of which is either only real or only imaginary and the third of which again contains 0 and 1 values only.

The foregoing description has been provided by way of a brief background of the invention which is not concerned with the nature of the DFT algorithm and is intended for use with any such algorithm. Neither is the invention concerned with the means used to implement the elementary DFTs and such means will not be described. These means will typically consist of a microprocessor programmed in accordance with the equations given in Gold and Rader, loc. cit. although a hardware implementation is naturally possible.

The invention is concerned with a problem which is well known in relation to DFTs and explained for example in Gold and Rader. This problem is jumbling of the output points relative to the input points. Although this problem can be dealt with by accepting a jumbled output set which has to be re-ordered or by so pre-jumbling the input set that the output set is in the right order, it is preferred for many purposes to deal with the problem by altering, in at least some levels of the computation, the addresses of the new points relative to the addresses of the old points. A simple example of the technique is illustrated in FIG. 6.12 of Gold and Rader and British patent specification No 1407401 describes in some detail a specific implementation of the technique as applied to the Cooley-Tukey type of algorithm.

Although the jumbling is always orderly and its nature can be calculated, the address reordering required for a Winograd type algorithm cannot be achieved by a simple, iterated bit-reversal rule such as is described in the British patent specification mentioned above. Furthermore, it is desirable to be able to utilize the same basic apparatus to perform any of a set of different DFTs for which the reordering operations will, in general be different. This is exemplified in the specific embodiment described below in which the apparatus can handle inverse and forward 840 point transforms and 94,168 and 420 point inverse transforms. A forward transform is from time domain to frequency domain and an inverse transform is from frequency domain to time domain.

SUMMARY OF THE INVENTION

According to the present invention, there is provided apparatus for performing the discrete Fourier transform comprising a data memory, and means for performing, in each of a succession of levels of the transform, elementary discrete Fourier transforms on groups of old points read out of the data memory. The groups of new points created by these transforms are written back into the data memory. A data memory addressing means establishes a predetermined but non-sequential addressing scheme for the reading out and/or the writing back of points. The data memory addressing means comprises an address memory storing address values, and further addressing means arranged to repeatedly address sequences of locations in the address memory to read out the address values.

The data and address memories could be parts of one large memory but separate devices are preferably used since the data memory must be a read/write memory while the address memory is preferably some form of ROM, e.g. a PROM.

The apparatus is preferably capable of operating in a plurality of different modes catering for different numbers N of data points. The address memory can have sections assigned to each different mode.

The address memory preferably also stores offset values which are used to establish base address values, the sequences of address values read out from the address memory being added modulo N to the current base address value to determine the data memory address. It will be shown that this enables all N points to be addressed in one level in groups of n using only one set of n address values and one offset value which repeatedly, i.e. (m−1) times, increments the base address value module N, where m=N/n.

It is accordingly an object of this invention to provide improved DFT apparatus which will provide non-jumbled output points.

It is a more specific object to provide DFT apparatus which can provide non-jumbled output points when utilzing a Winograd type of algorithm.

It is a further object to provide DFT apparatus which can provide non-jumbled output points for a plurality of different DFT's having different re-ordering requirements.

DESCRIPTION OF PREFERRED EMBODIMENT

Figure 1:
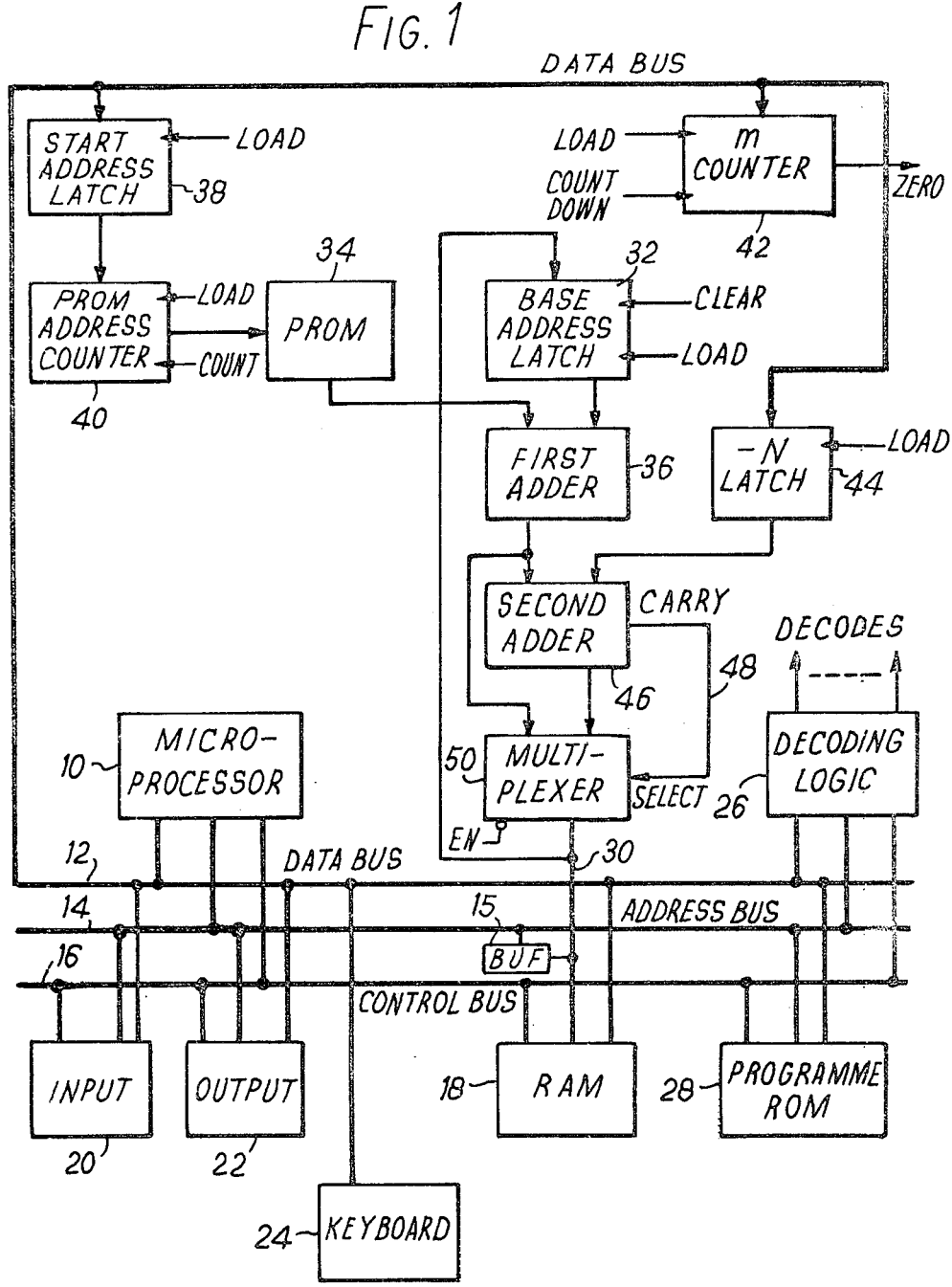
FIG. 1 is a block diagram of an embodiment of the invention.

Referring to FIG. 1, a microprocessor 10 may be any of the many commercially available, single chip devices, such as an 8-bit microprocessor with an 8-bit data bus 12, a 16-bit address bus 14, and a control bus 16 including lines for handshaking, handling interrupts, determining whether memory is read from or written into, and so on. These buses are interfaced conventionally to peripheral devices and read-write RAM memory 18. The peripheral devices are illustrated as an input device 20 which is the source of the input data, i.e. the DFT input points, an output device 22, e.g. a printer for the results, and a keyboard 24 which may be a full alphanumeric keyboard, a numerical keypad or a custom built set of front panel keys from the DFT instrument.

The microprocessor is programmed to perform two main functions (in addition to data input and output). It performs the elementary DFTs on the basis of the well known algorithms therefor. It also controls the overall sequencing of operations via decoding logic 26 and in accordance with the flow chart of FIG. 2. The programs are conveniently implemented as firmware, represented by a program ROM 28. As described to this point, the arrangement is a fairly typical microprocessor system and further detailed description is not necessary. The detailed implementation will in any event depend upon the particular microprocessor chip which is selected.

The decoding logic 26 provides load, count and enable signals to the devices now to be described and which provide the addresses to the RAM 18 on a bus 30 for reading and writing data. Since the instrument handles up to 840 points, 10 bits ($2^{10}=1024$) are needed to address the points. However these 10 bits may not be employed as the least significant bits, as will be explained below.

The address bus 14 is not identical with the RAM address bus 30. Rather these buses are buffered by buffer 15 and the logic 26 determines when a multiplexer 50 of an address generator (described below) is enabled and when the buffer 15 is enabled, by signals EN. The buffered address bus 14 is selected during data input and output while the multiplexer 50, which generates the addresses used during the DFT processing is enabled during such processing.

In one specific embodiment, the address generator has 12 bits of address, although the sizes of DFTs currently used make use of no more than 10 bits. All 12 bits are connected to the RAM 18. The RAM 18 is 32 bits wide, 16 bits containing the real data and 16 the imaginary data. The data are fed to two 16 bit arithmetic units which perform the DFT operations. Thus the address bits are in this case the least significant address bits, though in general, and with an arithmetic unit or microprocessor which handles data in bytes, or where multiple precision arithmetic is used, there would be extra least significant address bits suppled by the microprocessor.

For example, in another possible, byte-oreintated embodiment, one or more least significant bits will be supplied by the microprocessor since each point consists of two values (the real and imaginary parts) and these values may well be multiple precision values. If, for example, double precision values are employed, each point consists of 4 bytes and, if the address bus consists of lines A0 to A15, the microprocessor will supply A0 and A1 (to select in succession the two bytes of the two values of each point), the 10-bit bus 30 will supply A2 to A11 to select the points, and the microprocessor will supply A12 to A15 in accordance with the region of the memory map to which the RAM 18 is assigned.

The 10-bit point address on bus 30 is provided essentially as the sum of a base address held in a 16-bit wide latch 32 and the output of a 256 word, 12-bit wide PROM 34, the sum being formed by a 12-bit wide first full adder 36. The bit widths mentioned are dictated by the availability of suitable 8-bit and 4-bit devices and more than cater for the required 10 bits for the point address.

For each level of the FFT, a corresponding start address is loaded into an 8-bit latch 38. In each level the N points are treated, in accordance with the Winograd algorithm, as a sequence of m groups of n points where $m = N/n$ and, in the example under consideration, n is 3, 4, 5, 7 or 8 as will appear more fully below. At the beginning of each group of points, the start address in the latch 38 is loaded into an 8-bit counter 40 which counts through a further 2n address values to access from the PROM 34 firstly the relative addresses of the n points of the group to be subjected to the elementary n-point DFT (relative in the sense that they are added to the base address in the latch 32), secondly the relative addresses to which the n new points created by the elementary DFT are written back, and finally an offset value which determines the new base address in the latch 32.

At the beginning of the level, a 12 bit counter 42 is loaded with the number m of groups in the sequence. The counter is decremented each time a group is processed and the zero status of the countersignals that the next level is to be performed.

The remainder of the circuitry allows addresses to wrap round so that, if $N=840$, address 841 becomes address 1, and so on. To this end $-N$ is held in a 16-bit latch 44 and a second 12-bit address 46 adds $-N$ to the output of the adder 36. To carry thus produced is signalled on a line 48 which controls a 1 out of 2 12-bit wide multiplexer 50. If the carry is not produced the output of the adder 46 is ignored and the adder 36 provides the point address on the bus 30. If the carry is produced the output of the adder 46 becomes the address on the bus 30.

After each group of n points has been processed the adders 36 and 46 add the offset to the contents of latch 32 to form the new base address in the latch 32, loaded by way of bus 30 as fed back to the latch.

The significance of these operations will become clear from the following specific example. The instrument is designed to implement the Winograd algorithm in general, and specifically programmed with addresses for five different modes listed in Table 1.

TABLE 1

| Mode | Direction of Transform | Number of Points N | Breakdown of N |
|---|---|---|---|
| 1 | Inverse | 84 | 3 × 4 × 7 |
| 2 | Inverse | 168 | 3 × 7 × 8 |
| 3 | Inverse | 420 | 3 × 4 × 5 × 7 |
| 4 | Inverse | 840 | 3 × 5 × 7 × 8 |
| 5 | Forward | 840 | 3 × 5 × 7 × 8 |

Table 2 gives a complete listing of the contents of the PROM 34 for modes 1 and 5. The listing for modes 2, 3 and 4 is omitted for simplicity. The numbers in parentheses are the hexadecimal addresses in the PROM, i.e. the addresses provided by the counter 40.

The numbers following these addresses are the PROM contents, in decimal.

TABLE 2

| MODE | 1 | | | 5 | | | |
|---|---|---|---|---|---|---|---|
| N | 84 | | | 840 | | | |
| n | 3 | 4 | 7 | 3 | 5 | 7 | 8 |
| m | 28 | 21 | 12 | 280 | 168 | 120 | 105 |
| RELATIVE READ-OUT ADDRESSES FOR RAM 18 | (00) 0<br>(01)56<br>(02)28 | (07) 0<br>(08)63<br>(09)42<br>(0A)21 | (10) 0<br>(11)48<br>(12)12<br>(13)60<br>(14)24<br>(15)72<br>(16)36 | (A2) 0<br>(A3)280<br>(A4)560 | (A9) 0<br>(AA)336<br>(AB)672<br>(AC)168<br>(AD)504 | (B4) 0<br>(B5)120<br>(B6)240<br>(B7)360<br>(B8)480<br>(B9)600<br>(BA)720 | (C3) 0<br>(C4)105<br>(C5)210<br>(C6)315<br>(C7)420<br>(C8)525<br>(C9)630<br>(CA)735 |
| RELATIVE WRITE-IN ADDRESSES FOR RAM 18 | (03) 0<br>(04)28<br>(05)56 | (0B) 0<br>(0C)21<br>(0D)42<br>(0E)63 | (17) 0<br>(18)12<br>(19)24<br>(1A)36<br>(1B)48<br>(1C)60<br>(1D)72 | (A5) 0<br>(A6)280<br>(A7)560 | (AE) 0<br>(AF)168<br>(B0)336<br>(B1)504<br>(B2)672 | (BB) 0<br>(BC)120<br>(BD)240<br>(BE)360<br>(BF)480<br>(C0)600<br>(C1)720 | (CB) 0<br>(CC)105<br>(CD)210<br>(CE)315<br>(CF)420<br>(D0)525<br>(D1)630<br>(D2)735 |
| OFFSET | (06)33 | (0F)40 | (1E)49 | (A8)393 | (B3)505 | (C2)553 | (D3)568 |
| COLUMN | 1 | 2 | 3 | 4 | 5 | 6 | 7 |

It will be noted that in columns 1, 2, 3 and 5 of Table 2 new points are written back into new addresses (a permutation of the old addresses). In columns 4, 6 and 7 the addresses are not permuted. This merely arises because of the specific operations which turn out to be needed to achieve the overall result that the output points are not jumbled relative to the input points. One advantage of the invention is that it is possible to programme the PROM 34 to meet whatever are the varying requirements of as many different modes as are desired.

Part of the detailed operation in Mode 5 will now be considered. The $-N$ latch 44 will hold $-840$. it will be assumed that the first level with $n=3$ has been completed and that the second level with $n=5$ is about to begin. The m register is loaded with 168 since 168 elementary DFTs have to be performed. The hexadecimal address A9 is loaded into the start address register 38. The operations then commence as listed in Table 3. Whichever adder output is ignored is bracketed, being indicated simply as ($-$) when the second adder does not produce a carry. The address on the bus 30 is bracketed when it is not used to address the RAM 18 but forms the new base address loaded into the latch 32.

Since the addresses are essentially unsigned, the select signal 48 is taken from the carry output of the second adder 46. This permits the correct operation of the 12 bit circuit with DFT sizes greater than 11 bits. Eg if $N=3000$, $-N$ is $4096-3000=1096$ in 12 bits. Added to an address from the first adder 36, say 23, would produce a result from the second adder 46 of $1096+23=1119$ ie positive in 12 bits, however no carry would be produced.

If a carry is not produced, then the output of the adder 46 is ignored and the adder 36 provides the point address on the bus 30. If a carry is produced then the output of the adder 46 becomes the address on bus 30.

TABLE 3

| PROM Address Counter 40 | Base Address (latch 32) | PROM output | First Adder Output | Second Adder Output | m - Counter 42 | Address on Bus 30 | Function |
|---|---|---|---|---|---|---|---|
| A9 | | | | | | | Load start address |
| A9 | 0 | 0 | 0 | (−) | 168 | 0 | Read out |
| AA | 0 | 336 | 336 | (−) | 168 | 336 | 5 old points |
| AB | 0 | 672 | 672 | (−) | 168 | 672 | to DFT |
| AC | 0 | 168 | 168 | (−) | 168 | 168 | |
| AD | 0 | 504 | 504 | (−) | 168 | 504 | |
| AE | 0 | 0 | 0 | (−) | 168 | 0 | Write back |
| AF | 0 | 168 | 168 | (−) | 168 | 168 | 5 new points |
| B0 | 0 | 336 | 336 | (−) | 168 | 336 | from DFT |
| B1 | 0 | 504 | 504 | (−) | 168 | 504 | |
| B2 | 0 | 672 | 672 | (−) | 168 | 672 | |
| B3 | 0 | 505 | 505 | (−) | 167 | (505) | Decrement m |
| A9 | 505 | | | | | | Load base address. Reload start address |

TABLE 3-continued

| PROM Address Counter 40 | Base Address (latch 32) | PROM output | First Adder Output | Second Adder Output | m - Counter 42 | Address on Bus 30 | Function |
|---|---|---|---|---|---|---|---|
| A9 | 505 | 0 | 505 | (−) | 167 | 505 | Read out |
| AA | 505 | 336 | (841) | 1 | 167 | 1 | another |
| AB | 505 | 672 | (1177) | 337 | 167 | 337 | 5 old points |
| AC | 505 | 168 | 673 | (−) | 167 | 673 | to DFT |
| AD | 505 | 504 | (1009) | 169 | 167 | 169 | |
| AE | 505 | 0 | 505 | (−) | 167 | 505 | Write back |
| AF | 505 | 168 | 673 | (−) | 167 | 673 | 5 new points |
| B0 | 505 | 336 | (841) | 1 | 167 | 1 | to DFT |
| B1 | 505 | 504 | (1009) | 169 | 167 | 169 | |
| B2 | 505 | 672 | (1177) | 337 | 167 | 337 | |
| B3 | 505 | 505 | (1010) | 172 | 166 | (505) | Decrement m |
| A9 | 172 | | | | | | Load base address. Reload start address |

Table 4 shows the end of the same level and the start of the next level with n=7.

TABLE 4

| PROM Address Counter 40 | Base Address (Latch 32) | PROM Output | First Adder Output | Second Adder Output | m - Counter 42 | Address or Bus 30 | Function |
|---|---|---|---|---|---|---|---|
| A9 | 335 | 0 | 335 | (−) | 1 | 335 | Read out last |
| AA | 335 | 336 | 671 | (−) | 1 | 671 | 5 old points |
| AB | 335 | 672 | (1007) | 167 | 1 | 167 | to DFT |
| AC | 335 | 168 | 503 | (−) | 1 | 503 | |
| AD | 335 | 504 | 839 | (−) | 1 | 839 | |
| AE | 355 | 0 | 335 | (−) | 1 | 335 | Write back last |
| AF | 335 | 168 | 503 | (−) | 1 | 503 | 5 new points |
| B0 | 335 | 336 | 671 | (−) | 1 | 671 | from DFT |
| B1 | 335 | 504 | 839 | (−) | 1 | 839 | |
| B2 | 335 | 672 | (1007) | 167 | 1 | 167 | |
| B3 | 335 | 505 | (840) | 0 | 0 | (0) | |
| m counter = 0: load start latch 38 with new start address B4, clear base address latch, load new m value. | | | | | | | |
| B4 | 0 | 0 | 0 | (−) | 120 | 0 | Read out first |
| B5 | 0 | 120 | 120 | (−) | 120 | 120 | 7 old points |
| B6 | 0 | 240 | 240 | (−) | 120 | 240 | to DFT |
| B7 | 0 | 360 | 360 | (−) | 120 | 360 | |
| B8 | 0 | 480 | 480 | (−) | 120 | 480 | |
| B9 | 0 | 600 | 600 | (−) | 120 | 600 | |
| BA | 0 | 720 | 720 | (−) | 120 | 720 | |
| BB | 0 | 0 | 0 | (−) | 120 | 0 | Write back |
| BC | 0 | 120 | 120 | (−) | 120 | 120 | 7 new points |
| BD | 0 | 240 | 240 | (−) | 120 | 240 | from DFT |
| BE | 0 | 360 | 360 | (−) | 120 | 360 | |
| BF | 0 | 480 | 480 | (−) | 120 | 480 | |
| C0 | 0 | 600 | 600 | (−) | 120 | 600 | |
| C1 | 0 | 720 | 720 | (−) | 120 | 720 | |
| C2 | 0 | 553 | 553 | (−) | 119 | (453) | Decrement m |
| B4 | 553 | | | Load base address. Reload start address | | | |
| B4 | 553 | 0 | 553 | (−) | 119 | 553 | |
| B5 | 553 | 120 | 673 | (−) | 119 | 673 | |
| Etc | | | | | | | |

Figure 2:
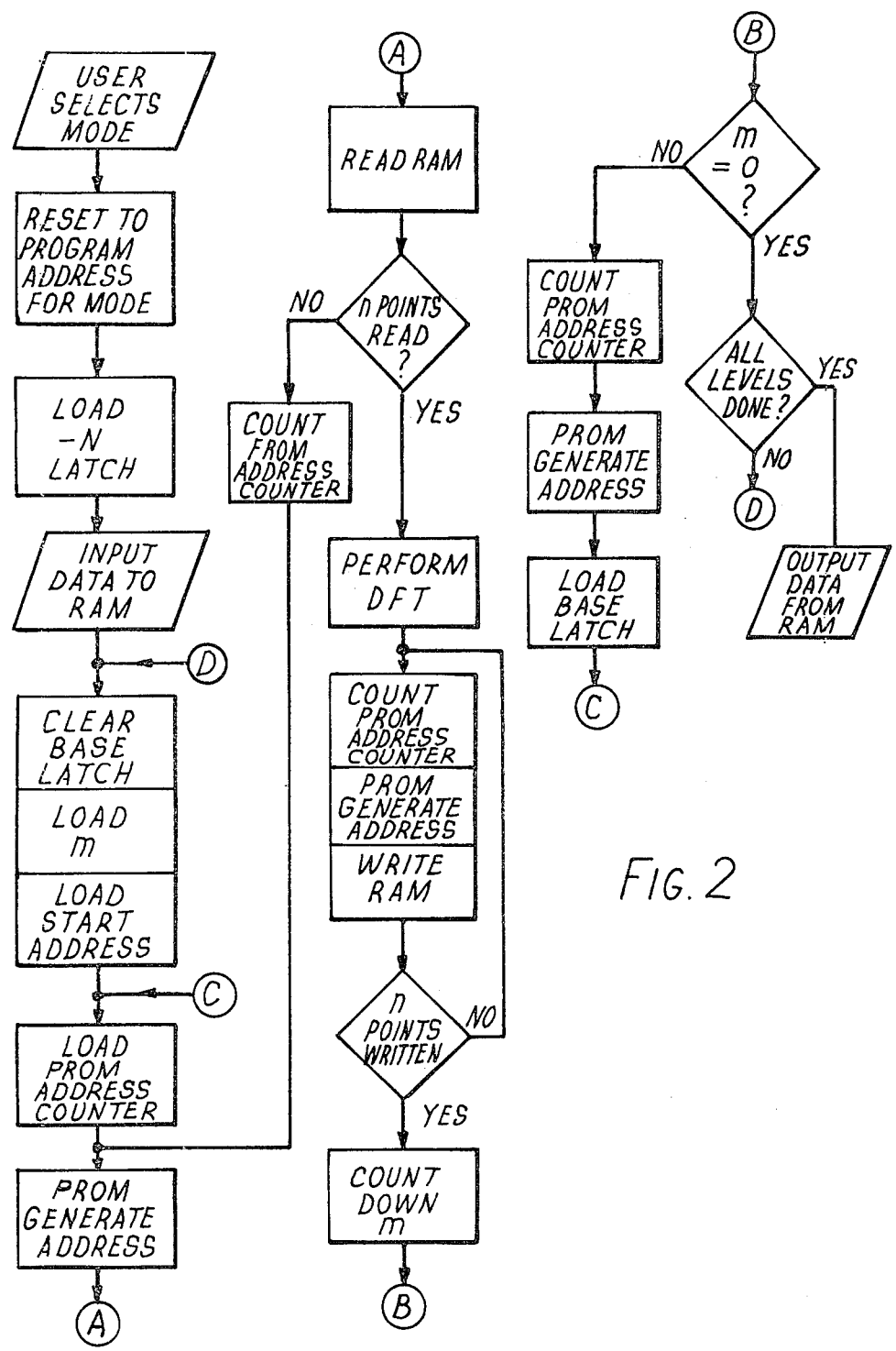
FIG. 2 is a flow chart illustrating the major stages of operation.

The overall sequencing of operations is relatively straightforward but for the sake of completeness FIG. 2 is a flow chart of the operations which the microprocessor is programmed to perform, principally by way of the decodes from the logic 26 providing the various load and other signals to the circuits of FIG. 1.

The program also takes care of loading the correct N value for the mode selected, loading the correct m values and keeping count of each group of n points and of the levels.

Many modifications to the described embodiment are possible. Some will depend upon the nature of the algorithm implemented. In FIG. 1 the PROM 34 is involved in determining both read-out and write-in addresses. For some algorithms the PROM may only be used in determining one set of addresses, the others being sequential. For some algorithms the PROM may also be involved in calling up the correct coefficients for each elementary DFT.

Other modifications are matters of more detailed design, e.g. the way in which functions are distributed between a suitably programmed microprocessor and dedicated circuitry.

Table 5 lists commercially available devices suitable for the dedicated circuitry of FIG. 1.

TABLE 5

| | | |
|---|---|---|
| Buffer | 15 | 2 × 74LS244 |
| Start address latch | 38 | 1 × 74LS374 |
| PROM address counter | 40 | 2 × 74S163 |
| PROM | 34 | 2 × 74LS287 or 3 × 82S129 |
| Base address latch | 32 | 2 × 74LS273 |
| m counter | 42 | 3 × 74S169 |
| Adder 36 and adder | 40 | each 3 × 74S283 |

TABLE 5-continued

| -N latch   | 44 | 2 × 74LS374 |
|------------|----|-----------  |
| Multiplexor | 50 | 3 × 74S257 |

Although Table 2 gives specific examples of start addresses in the PROM, the description of the invention will be completed by explaining how these addresses are derived. An N point DFT is to be performed on a set of N complex items of data where N is a compound of k dimensions, $N = N_1 \times N_2 \times \ldots \times N_k$, and where the $N_1, N_2, \ldots N_k$ are mutually prime (ie contain no common factors between them). The whole operation can be separated into a series of K levels, $i = 1, 2, \ldots k$, of (N/Ni) Ni-point transforms.

For a given level, i, corresponding to dimension Ni, the Ni points, on which a Ni-point transform is to be performed, are separated in position within the array by a distance $$\left(\left(\left(\frac{N}{N_i}\right)^{\phi_{N_i}}\right)\right)_N$$

where $(( \quad ))_N$ signifies reduction modulo N and where $\phi_{N_i}$ is Euler's totient function for $N_i$, defined as the number of integers less than Ni which do not have any factor other than 1 in common with Ni. The values of $\phi_{N_i}$ for some small integers are:

Ni  1 2 3 4 5 6 7 8 9 10 11 12 13 14
$\phi_{N_i}$ 0 1 2 2 4 2 6 4 6 4 10 4 12 6

The Ni results from the Ni-point transform are written back into the array in a permutation of the input positions, this time separated by a distance (N/Ni).

The remapping of input and output positions, calculated modulo N, performs at each stage an element of the overall reordering necessary to produce sequentially addressed outputs from sequentially addressed inputs.

The above input separation holds true for the forward transform. For the inverse transform the input ordering is reversed by using a separation of $$\left(\left(N - \left(\frac{N}{N_i}\right)^{\phi_{N_i}}\right)\right)_N$$

The (N/Ni) groups of Ni points are separated by an offset from the previous group by a distance $$\left(\left(\sum_{\substack{j=7 \\ j \neq i}}^{k} \frac{N}{N_j}\right)\right)_N$$

This is the formula used to derive the offsets given in Table 2. However the result of the (N/Ni) transforms is indpendent of the order in which they are performed, and any other expression, which produces a different permutation of the order in which the transforms are performed, is equally valid.

The values for the Ni input and Ni output address relative to the first input point of the Ni-point transform are precomputed from the above equations, and, together with the inter-group offset distance are stored in the address PROM.

The input and output addresses and group separation for dimension Ni are stored in the address PROM in the order in which they are required by the DFT routine for that dimension. The Table 2 gives the appropriate order for a set of DFT routines which take their input points in the order x(0), x(), x(2), ..., X(Ni−1) and which store their output points in the order x(1), x(2), x(3), ..., x(Ni−1), x(0)

and then advance to the next group of points.

I claim:

1. Apparatus for performing the discrete Fourier transform comprising:
   a data memory for storing data relating to groups of old points to be transformed and data relating to groups of new points which have been transformed;
   means coupled to the data memory for performing, in each of a succession of levels of transform, elementary discrete Fourier transforms on said groups of old points, thereby to form said groups of new points; and
   data memory addressing means coupled to the data memory including:
   an address memory for storing address values;
   first means for storing the number N of points to be transformed for each level;
   second means for storing the number m of groups of points;
   further addressing means for repeatedly addressing sequences of locations in said address memory to read out said address values; and
   address generating means responsive to said first and second storing means and to the output of said address memory for generating a predetermined series of addresses for reading out said old points from the data memory and writing back said new points into the data memory, wherein said series of addresses is non-sequential for at least one of said reading out and writing back operations performed on said points.

2. Apparatus according to claim 1, wherein said first and second storing means and said further addressing means include means for receiving values corresponding to a selected mode for performing different discrete Fourier transforms and for selecting corresponding portions of the address memory.

3. Apparatus according to claim 1, wherein the address memory stores different sequences of address values for read-out and write-in of data.

4. Apparatus according to claim 1, wherein said address generating means comprising means for storing a base address value and means for adding the address values from the address memory to the base address value to provide point addresses for the data memory.

5. Apparatus according to claim 4, wherein the adding means adds modulo N.

6. Apparatus according to claim 4, wherein the address memory further includes means for holding offset values which are periodically read out to modify the base address value.

7. Apparatus according to claim 6, wherein for each level in which n points at a time undergo the elementary discrete Fourier transform, the address memory includes means for holding in sequence, n address values for data read-out, n address values for data write-in, and an offset value which increments the base value after each elementary discrete Fourier transform.

8. A method of performing the discrete Fourier transform upon a set of N data points in a succession of levels of the transform, comprising the steps of storing said N data points in a data memory, and, in each level:
  (a) generating a first set of address values;
  (b) reading out the data points in m groups, under the control of said first set of address values, and storing these groups of data points in said data memory;
  (c) subjecting each such stored group to an elementary discrete Fourier transform to form a group of new points;
  (d) generating a second set of address values;
  (e) writing back said new points into said data memory under the control of said second set of address values; and
  (f) generating non-sequential address values for at least one of said first and second sets of address values, including the steps of:
    (i) storing non-sequential address values in an address memory; and
    (ii) accessing locations of said address memory sequentially to provide said non-sequential address values.

* * * * *